Dec. 22, 1925.
C. L. JOHNSON
TIRE LOCK CABLE
Filed June 27, 1921
1,566,965
2 Sheets-Sheet 1
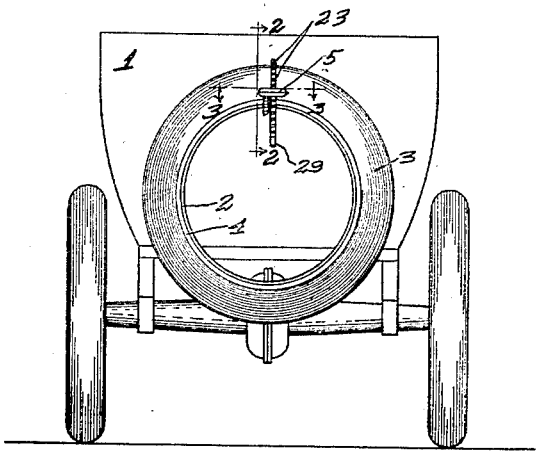
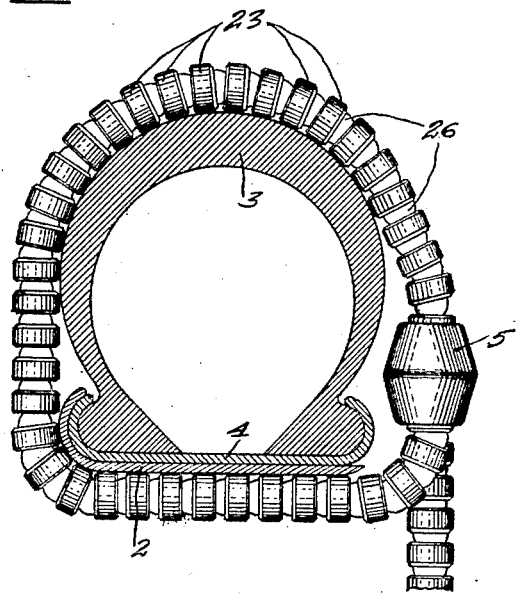

Dec. 22, 1925.
C. L. JOHNSON
1,566,965
TIRE LOCK CABLE
Filed June 27, 1921   2 Sheets-Sheet 2
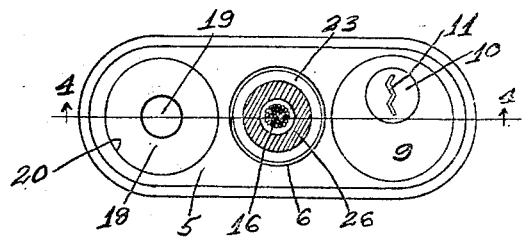
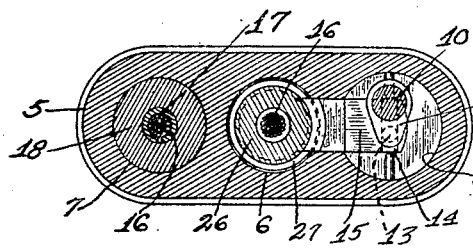
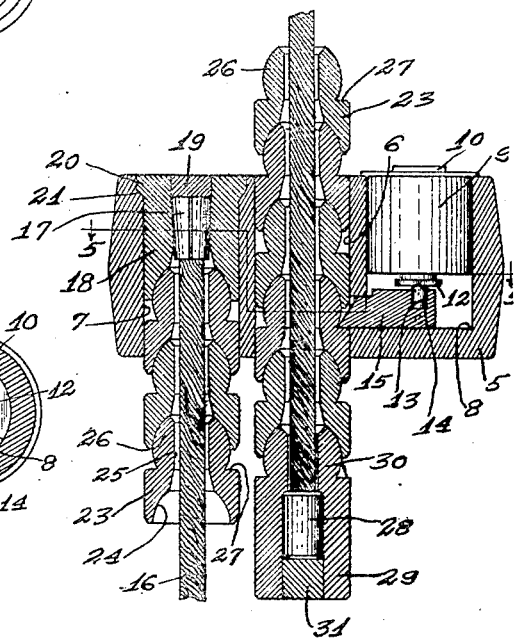
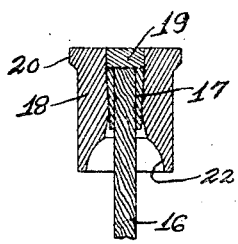
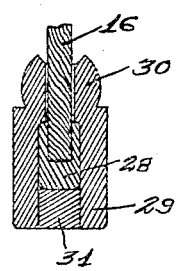
Witnesses
Rudolph T. Berg.
Charles Hills Jr.
Inventor
Colvin L. Johnson.
By Charles Hills Atty.

Patented Dec. 22, 1925.

1,566,965

UNITED STATES PATENT OFFICE.

COLVIN L. JOHNSON, OF CHICAGO, ILLINOIS, ASSIGNOR TO JOHNSON AUTOMOBILE LOCK CO., A CORPORATION OF ILLINOIS.

TIRE-LOCK CABLE.

Application filed June 27, 1921. Serial No. 480,896.

*To all whom it may concern:*

Be it known that I, COLVIN L. JOHNSON, a citizen of the United States, and a resident of the city of Chicago, in the county of Cook and State of Illinois, have invented certain new and useful Improvements in a Tire-Lock Cable; and I do hereby declare that the following is a full, clear, and exact description of the same, reference being had to the accompanying drawings, and to the numerals of reference marked thereon, which form a part of this specification.

This invention relates to a tire lock having an improved type of a flexible armored cable equipped with improved end members adapted to prevent access to a stranded steel cable which is enclosed by an armored covering.

It is an object of this invention to provide an improved armored cable for use with automobile tire locks.

Another object of the invention is the construction of a tire lock having a flexible cable provided with improved end members for holding ball and socket armor members closely associated with one another to enclose the cable to make the same inaccessible.

It is a further object of the invention to provide a tire lock having a stranded steel cable enclosed by an armored covering, one of the end members of which is rotatably engaged on one end of the cable to prevent twisting of said cable to break the same.

It is an important object of this invention to provide an improved tire lock wherein a flexible cable is covered with a flexible armored covering held in place at one end by a wedged end member and at the other end by means of a rotatable end member.

Other and further important objects of this invention will be apparent from the disclosures in the specification and the accompanying drawings.

The invention (in a preferred form) is illustrated in the drawings and hereinafter more fully described.

On the drawings:

Figure 1 is a rear elevation of an automobile showing a spare tire locked in place by means of an improved tire lock embodying the principles of this invention.

Figure 2 is an enlarged sectional view taken on line 2—2 of Figure 1.

Figure 3 is an enlarged plan view of the lock block taken on line 3—3 of Figure 1.

Figure 4 is a detail section taken on line 4—4 of Figure 3 showing parts in elevation.

Figure 5 is a section taken on line 5—5 of Figure 4.

Figure 6 is a longitudinal detail section through one of the end members of the armored cable.

Figure 7 is a longitudinal detail section through the other end member of the armored cable.

As shown on the drawings:

The reference numeral 1 indicates an automobile having rigidly supported on the rear thereof a spare tire support or carrier rim 2 for removably receiving and holding a spare tire 3 in position. The spare tire rim 4 is adapted to slide on the supporting rim 2. For the purpose of retaining the spare tire in place an improved tire lock is used as illustrated in Figures 1 and 2.

The tire lock comprises a metal block 5 provided with cable openings 6 and 7, and with a lock chamber or recess 8. Securely mounted in the chamber 8 is a cylinder lock 9 provided with a rotating barrel or cylinder 10 having a key slot 11 for the purpose of receiving a key for rotating said barrel. Engaged on the inner end of the barrel 10 is a cam or crank plate 12 carrying a pin 13. The pin 13 is engaged in a transverse slot or groove 14 provided in a locking bolt or latch 15 slidably disposed within the block chamber 8 with the inner tapered end thereof projecting into the cable opening 6 as illustrated in Figures 4 and 5. Normally the latch 15 is held retracted by turning the lock barrel 10 by means of a key.

The block openings 6 and 7 are provided for receiving the improved armored cable shown in detail in Figures 4, 6 and 7. The armored cable comprises a round stranded steel cable 16 having one end thereof rigidly clamped in a split conical or tapered wedge plug 17. The split wedge plug 17 is driven into a tapered recess or passage provided in a cable terminal attaching head 18. The end of the cable 16 and the wedge plug 17 are covered by means of a finishing plug 19 which is also forced into the terminal head 18 and brazed or soldered in place flush with the outer end of the terminal head 18 as shown in Figure 6. The terminal head 18 is provided with an integral flange 20 which is adapted to seat in groove 21 formed by enlarging the upper end of the block opening 7 to prevent the terminal head 18 from being drawn through the block opening 7. The inner end of the terminal head 18 is provided with a circular or rounded socket or recess 22.

Arranged adjacent one another in interfitting adjustable relation on the cable 16 are a plurality of ball and socket armor links or knuckles which form an armored casing for protecting the cable 16. Each armored link comprises a cylindrical socket head 23 one end of which is provided with a semi-spherical or rounded recess or socket 24 which communicates with an axial passage 25 formed in a ball 26 integral with the other end of the socket head 23. The ball 26 of one cable link movably fits into the socket recess 24 of an adjacent cable link to form a ball and socket flexible armored covering or casing for the stranded steel cable 16. A shoulder 27 is formed on each cable link where the ball 26 joins the head 23.

Rigidly brazed or soldered on the second end of the stranded cable 16 is a cylindrical head or bearing cylinder 28. Rotatably engaged on the bearing head 28 is a passaged cylindrical terminal head 29 having a passaged ball 30 integrally formed on one end thereof. A plug 31 is rigidly secured in the end of the terminal head 29 and is brazed or soldered in place to prevent access to the cable head 28. The ball 30 seats in the rounded socket 24 of the link adjacent the terminal head 29—30.

The rotatable terminal head 29—30 is first engaged on the headed end of cable 16, after which the ball and socket links 23—26 are engaged on said cable in interfitting relation as illustrated in Figure 4. The terminal head 18 is then rigidly secured on the second end of the cable 16 which is tensioned to hold the armored members in proper interfitting relation to completely enclose the cable 16 thereby preventing access thereto by unauthorized persons who may desire to break or cut the cable.

The operation is as follows:

The spare tire 3 and its rim 4 are placed upon the automobile carrier rim 2. To lock the tire 3 in place upon the carrier rim 2 the armored cable is engaged by the tire 3 and the carrier rim 2 as illustrated in Figure 2. The free end of the armored cable is inserted through the block opening 6 and is pulled through the block 5 until the flexible armored cable firmly grips around the tire to hold the same in position on the mounting rim 2.

When the cable is pulled through the block 5 the latch 15 is in retracted position thereby permitting the armored cable to slide through the opening 6. When the armored cable has been properly engaged around the tire 3 and the rim 2 a key is inserted in the key slot 11 of the lock barrel 10. By turning the key the barrel 10 is rotated thereby causing the lock pin 13 to slide in the latch groove 14. The latch is thus forced to project into the block passage 6 into locking engagement behind the shoulder 27 of one of the armor links 23—26 as shown in Figure 4. With the latch 15 in projected latching position the armored cable is locked against being withdrawn through the block 5. The tire is thus securely locked on the rim 2.

It has been found through experience, that in tire locks of the type herein disclosed attempts have been made to twist the enclosed cable until the same breaks. This breaking of the cable was accomplished by tightly gripping the end terminal member rigidly secured to the cable at the free end of the armored cable and turning the same to cause twisting of the cable enclosed by the armored casing. To obviate twisting of the steel cable 16 in the present invention, the improved terminal head 29 was provided to rotate on the cable head 28 thereby making it impossible to twist the cable 16 with the intention of breaking the same.

As will be evident from an examination of the drawings the stranded steel cable 16 is completely enclosed by the armor covering and is absolutely protected against being cut or otherwise interfered with.

To release the tire lock the key is again inserted into the key slot 11 of the lock 9. By now rotating the lock barrel 10 in a reverse direction the pin 13 acts to retract the latch 15 out of engagement with the armored covering of the cable 16. When the latch is released the armored cable can be drawn through the block opening 6 to permit removal of the tire lock from the tire 3 and the carrier rim 2. The tire 3 and its rim 4 may now be removed from the carrier rim 2 if desired.

I am aware that numerous details of construction may be varied through a wide range without departing from the principles of this invention, and I therefore do not purpose limiting the patent granted otherwise than necessitated by the prior art.

I claim as my invention:

An armored tire lock device comprising a cable, a head on one end thereof, a passaged terminal member rotatably engaged on said cable and head, a plug rigidly secured in one end of said terminal member to enclose said head, a plurality of interfitting ball and socket links engaged on said cable, a ball member integral with said terminal member and engaging into one of said links, a second passaged terminal member engaged on the other end of the cable and engaged by the end link at that end of the cable, a split wedge engaged on said cable and driven into said second terminal member to tension said cable for holding the links in interfitting operating relation, and a plug secured into the end of said second terminal member to enclose the end of the cable.

In testimony whereof I have hereunto subscribed my name.

COLVIN L. JOHNSON.